Sept. 9, 1969   V. K. PELTOLA   3,466,542
MAGNETICALLY CONTROLLED METER MOVEMENT APPARATUS
Filed Jan. 8, 1968
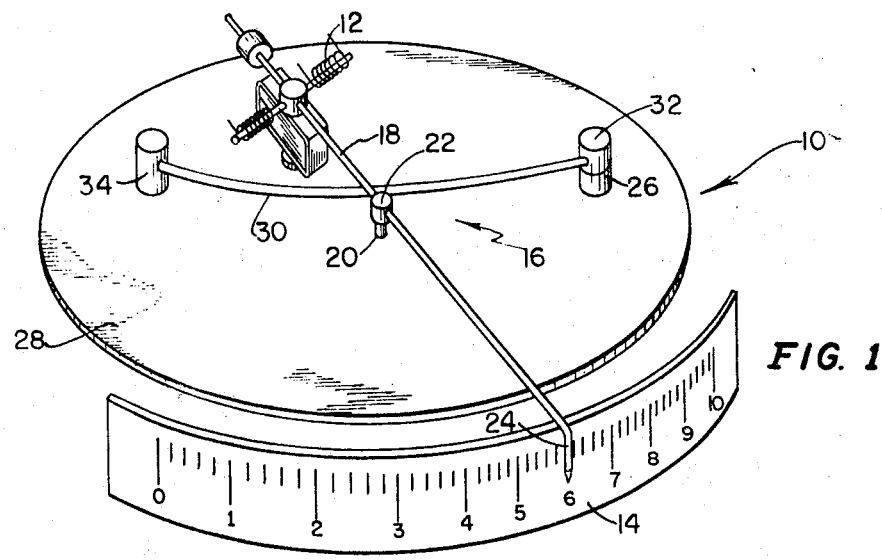
FIG. 1
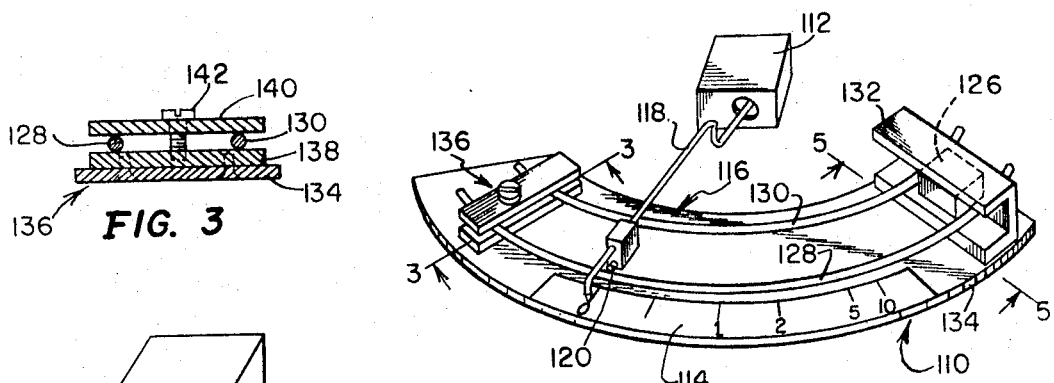
FIG. 2
FIG. 3
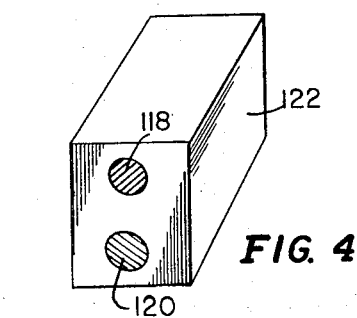
FIG. 4
FIG. 5
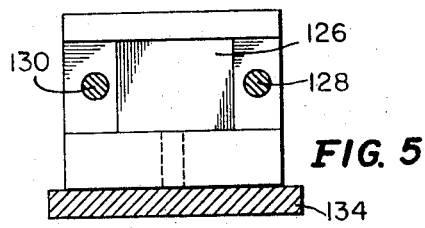
Inventor
VEIKKO K. PELTOLA
BY Silverman & Cass
ATTYS.

United States Patent Office 3,466,542
Patented Sept. 9, 1969

3,466,542
MAGNETICALLY CONTROLLED METER
MOVEMENT APPARATUS
Veikko K. Peltola, Chicago, Ill., assignor to Alnor Instrument Company, Division of Illinois Testing Laboratories, Inc., Chicago, Ill., a corporation of Illinois
Filed Jan. 8, 1968, Ser. No. 696,270
Int. Cl. G01r 15/10
U.S. Cl. 324—132                    7 Claims

ABSTRACT OF THE DISCLOSURE

A meter movement apparatus in which a pointer magnet is attached to the pointer of a standard D'Arsonval meter. An arcuately shaped pole shoe coupled to a fixed magnet is positioned in eccentric relationship to the path of the pointer magnet so that as current is applied to the meter, the pointer moves upscale and, due to the magnetic leakage between the pole shoe and fixed magnet, a flux field, which varies exponentially with the input to the apparatus, is created. The varying flux field causes the meter needle to be translated along increments of distance on the scale of the apparatus which are related exponentially to the input to the apparatus.

BACKGROUND OF THE INVENTION

This invention relates generally to an electrical indicating apparatus and in particular to a magnetically controlled meter in which a flux field produced within the apparatus varies exponentially with the input to the apparatus. The exponentially varying flux field enables a needle coupled to the meter to be translated into either equal or exponentially varying increments of distance on a scale of the apparatus.

Heretofore, the art has not taught the use of magnetically controlling an electrical indicating apparatus by exponentially varying a field of flux within the apparatus. However, the prior art has taught various ways to retard or damp the oscillations of an instrument pointer by using a constant or fixed magnetic field. Generally, such damping consists of one or more permanent magnets by themselves or in combination with electromagnets fixedly positioned perpendicular to the meter needle and arranged parallel to the semi-circular path of a vane of magnetizable material carried on the meter needle. The coaction of these elements is such that a constant magnetic field is established to uniformly damp or retard the movement of the needle.

Heretofore exponential transducers have been coupled to conventional meters and then adapted to read the input to the apparatus. By use of the present invention, direct, simple and accurate readings are obtained. For example, in radiation pyrometry, the output of some radiation transducers is a current that increases logarithmically with the amount of radiation impinging on the transducer. Elaborate measuring systems have been employed in order to obtain accurate data from such logarithmic or other exponentially varying devices. The present invention would obviate need for such elaborate measuring systems.

SUMMARY OF INVENTION

The magnetically controlled meter movement apparatus made in accordance with this invention removes the limitation of the prior art meter movement as above described.

One embodiment of the invention uses a standard D'Arsonval meter movement with the addition of a small magnet attached to its pointer. The pointer magnet is magnetically coupled to a fixed auxiliary magnet. The auxiliary magnet is connected to one end of a curved soft iron wire which serves as a pole shoe for one pole of the magnet. A soft iron platform, to which the auxiliary magnet is affixed serves as a pole shoe for the other pole of that magnet. The polarity of the auxiliary magnet is arranged to oppose the flux of the pointer magnet.

The pole shoe is arcuately shaped and eccentric relative to the path of the pointer magnet so as to cause a logarithmic or other exponential flux distribution. As current is applied to the D'Arsonval meter movement, its pointer moves up scale; however, the closer the pointer magnet gets to the fixed auxiliary magnet, the greater the repulsive force is between the magnets and therefore, the greater the current required to move the pointer further upscale.

In a second embodiment of the invention, the D'Arsonval meter movement is magnetically coupled to two soft iron wires, each of which is connected at one end to the opposite pole of a permanent magnet. The opposite ends of the wires are connected to a non-magnetic material. The wires, are farther apart in the vicinity of the non-magnetic connected end than in the vicinity of the magnetic end.

A magnet is also attached to the pointer of the meter and so disposed that it repulses the fixed magnet. Therefore, when current is applied to the coil of the D'Arsonval meter, the needle must overcome the increased repulsion between the converging pointer and fixed magnets.

Accordingly, the principal object of this invention is to provide a magnetically controlled meter movement apparatus which has an exponentially varying flux distribution to cause a meter needle to be translated into either equal or exponentially varying increments of distance on a scale of the apparatus.

It is another object of this invention to provide a magnetically controlled meter movement which is linearly responsive to an exponentially varying input.

Other objects and features of this invention will become apparent from the following detailed description and accompanying drawings.

BRIEF DESCRIPTION OF THE DRAWINGS

FIG. 1 is a diagrammatic perspective view of one embodiment of the invention;

FIG. 2 is a diagrammatic perspective view of a second embodiment of the invention;

FIG. 3 is a sectional view taken along line 3—3 of FIG. 2 and in the direction indicated generally.

FIG. 4 is a perspective view of the housing of FIG. 2 taken from the front end thereof and with portions thereof in section to show details thereof.

FIG. 5 is a fragmentary sectional view taken along the lines 5—5 of FIG. 2 and showing the fixed magnetic housing.

DESCRIPTION OF THE PREFERRED EMBODIMENT

FIG. 1 illustrates a magnetically controlled meter movement apparatus 10 which has an exponentially varying flux distribution. The apparatus 10 comprises a D'Arsonval type meter movement 12, which is well known in the art, a scale 14, and a magnetic circuit 16. The D'Arsonval meter movement 12 has an arm 18 which is coupled to the magnetic circuit 16 by means of a magnet 20, which is connected to the arm 18 by a magnet holder 22. A pointer 24 is coupled to the arm 18 and extends over the scale 14.

The magnetic circuit 16, to which the arm 18 is magnetically coupled, comprises a fixed magnet 26 and a pair of pole shoes 28 and 30. One pole of the fixed magnet 26 is affixed to the pole shoe 28, which also provides a platform for the circuit elements. A soft iron pole piece 32 is affixed to the other pole of magnet 26. The pole shoe 30 is a curved soft iron wire and is connected between the pole piece 32 and a non-magnetic support post 34, which is mounted on the pole shoe 28. Preferably, the pole shoes are parallel.

The incremental distances, illustrated on scale 14 and denoted by numerals 0–10, are equally spaced, and are appropriate when an exponentially varying input is applied to the meter; the magnetic circuit being the anti exponential of the input. However, if the input to the meter is linear, the scale 14 would represent the exponential of the magnetic circuit 16 which would result in the numerals 0–10 on the scale varying exponentially in accordance with the meter circuit.

The pole shoe 30 is curved so that it is farther from the arc of the pointer magnet 20 at the low end of scale 14 than at the high end of the scale. This varies the magnetic force between the pointer magnet 20 and the pole shoe 30 along the path of movement of the pointer magnet such that there is an exponentially progressive increase of magnetic flux linking the two magnets as the pointer arm 18 is driven upscale.

The magnet 20 is positioned so that it opposes the polarity of the fixed magnet 26, i.e., the poles of both magnets are oriented the same. The strength of the magnetic field in the vicinity of the curved pole shoe 30 is progressively weaker at positions farther from the fixed magnet 26 because of the leakage between the pole shoes 28 and 30. Thus, the magnetic repulsing force between the field of the pointer magnet 20 and the field near the pole shoe 30 will be weaker at points farthest from the fixed magnet 26, because of the aforementioned leakage and the increasing distance between the similar pole portions of the magnets 20 and 26. The relationship between the curved pole shoe 30, the pointer magnet 20, and the fixed magnet 26, relative to each other determines a particular flux distribution; therefore, appropriate shaping of the curved pole shoe 30 relative to the arcuate path of the magnet 20 will elicit a determinable exponential flux pattern or distribution, which will apply a similar damping to the meter movement such that a logarithmic or other exponential scale response, with respect to the input carrent to the meter 12, can be achieved. Also, a transducer, or other similar device, whose output current varies logarithmically or in any other exponential relationship with respect to a given parameter, such as in radiation pyrometry, can be coupled to the apparatus 10 such that the resulting meter response will be translated into equal increments of distance on the scale 14 of the apparatus, as illustrated in FIG. 1. The relationship between the curved pole shoe 30, the pointer magnet 20, and the fixed magnet 26 is arranged to the exponential input to the meter. If the input to the meter is linear, the scale 14 is arranged to represent the exponential of the flux distribution as above described.

As shown in FIG. 1, zero point of the scale 14 is at its left hand side. As a current is applied to the meter movement 12, the arm 18 proceeds upscale and encounters more resistance due to the converging of the repulsive forces of the magnets 20 and 26. Thus, the meter 12 requires more and more input current per unit distance of movement of the arm 18 and its pointer magnet 20 toward magnet 26.

FIG. 2 illustrates a second embodiment 110 of a magnetically controlled meter movement apparatus. The apparatus 110 comprises a D'Arsonval type meter movement 112, a scale 114 and a magnetic circuit 116. The meter movement 112 has a pointer 118 which is coupled to the magnetic circuit 116 by means of magnet 120, which is slidably coupled to the pointer 118 by a housing 122 (shown in FIG. 4).

The magnet circuit 116, to which the pointer 118 is magnetically coupled, comprises a fixed magnet 126 and a pair of pole shoes 128, 130. The fixed magnet 126 is enclosed in an aluminum housing 132 which is affixed to a soft iron frame 134 of the meter. The pole shoes 128 and 130 are of curved soft iron wire and are coupled to opposite poles of the fixed magnet 126. The opposite ends of the pole pieces are coupled to a non-magnetic wire holder 136, which is illustrated in FIG. 3.

As shown in FIG. 3, the wire holder 136 comprises an aluminum block 138 which is affixed to the frame 134. The pole shoes 128 and 130 are positioned on the aluminum block 138 and held in place by a cover plate 140 which is secured to the block 138 by means of a screw 142. The pole shoes 128, 130 are adjustable at the wire holder 136; the farther the pole shoes are apart, the greater the magnetic leakage therebetween. The mean distance between the pole shoes 128 and 130 in the vicinity of the wire holder is greater than in the vicinity of the magnet 126. Therefore, the magnetic force between the pole shoes at the wire holder 136 is less than at the magnet 126. Also, the magnetic force of the pole pieces in the vicinity of the wire holder 136 is less than at the magnet 126, because of the distance from the magnet 126. There is also leakage between the pole shoes 128, 130 and the soft iron frame 134. Therefore, the magnetic force between the field of the pointer magnet 120 and the field between the pole shoes 128, 130 will be weaker at points farthest from the magnet 126, because of the aforementioned leakage and distance from the magnet 126.

The pointer magnet 120 and the fixed magnet 126 are arranged so that their respective poles repel each other. Therefore, as the input current to the meter 112 increases, the pointer magnet 120 is moved closer to the fixed magnet 126 which in turn increases the repulsive force between the magnets. As the magnet 120 approaches magnet 126, more current drive is required to overcome the repulsive force of the magnets and move the arm 118 farther upscale. Therefore, by shaping the curved pole shoes and adjusting the distance therebetween relative to the magnets 120 and 126, a logarithmic or other exponential flux distribution is achieved.

It will be appreciated that the pointer magnets 20 and 120 could also be positioned to be attracted to the fixed magnets 26 and 126. In so doing, the fixed magnets would be positioned at the low end of the scale. Therefore, when current would be applied to the coil of the D'Arsonval meter, the needle would have to overcome the attraction between the pointer magnet and the fixed magnet. Thus, the meter 12 or 112 would require less and less input current per unit distance of movement of the arm 18 or 118 and its pointer magnet 20 or 120 away from the magnet 26 or 126.

As in the first embodiment 10, the printed scale 114 may be of equal or exponentially varying increments of distances, depending on the input to the meter movement 112. As shown, the scale 114 is logarithmic.

What is desired to secure by Letters Patent of the United States is:

1. A magnetically controlled meter movement apparatus comprising, a meter movement having a pointer responsive to changes of input to said meter, said pointer being pivoted to translate along a smooth path concentric about a point of said meter, a magnetic circuit magnetically coupled to said pointer, said magnetic circuit including, a fixed magnet, a pointer magnet mounted to said pointer, a first pole shoe coupled to one pole of the fixed magnet, a second, arcuately shaped and elongated pole shoe coupled to the other pole of said fixed magnet, said pole shoes lying in generally parallel planes, the pointer and magnetic circuit defining an exponential flux distribution proportional to the changes of input to said meter, said exponential flux distribution effecting a relative exponential response by said pointer on a scale of said apparatus.

2. A magnetically controlled meter movement apparatus as defined in claim 1 wherein said smooth path of the pointer and the arcuate shape of said second pole shoe are eccentric to one another.

3. A magnetically controlled meter movement apparatus as defined in claim 2 in which said meter is arranged such that the distance between said second pole shoe and said pointer magnet decreases as the pointer moves upscale.

4. A magnetically controlled meter movement apparatus as defined in claim 1 in which said pointer magnet has its polarity disposed to oppose the polarity of said fixed magnet.

5. An apparatus as defined in claim 1 in which said fixed magnet and the pointer magnet have their respective polarities disposed to attract one another.

6. A magnetic circuit for an apparatus having a pointer responsive to an electrical input, said magnetic circuit comprising, magnetic means to produce an exponential flux distribution which varies with the input to the apparatus, said magnetic means including, a fixed magnet, a pair of elongated, similarly shaped pole shoes secured at one end in magnetic linkage to opposite poles of said fixed magnet and secured at their remote ends such that the mean distance between their one ends is significantly different than the mean distance between their remote ends, and a pointer magnet mounted to said pointer and interposed within the magnetic flux path defined by said pole shoes, said magnetic means being coupled to the pointer to induce it to be translated into one of equal, exponentially varying, and a combination of equal and exponentially varying increments of distance on a scale of the apparatus.

7. An apparatus as defined in claim 6 in which said fixed magnet and the pointer magnet have their respective polarities disposed to oppose one another, the distance between said pole shoes is smaller proximate the fixed ends than proximate their remote ends, and said input to the apparatus is required to increase exponentially per increment of scaled distance as the pointer magnet approaches the fixed magnet because of the repulsion force between said magnets.

References Cited

UNITED STATES PATENTS 3,049,668    8/1962    Borell              324—132
3,177,788    4/1965    Prinsen          324—132 X RUDOLPH V. ROLINEC, Primary Examiner A. E. SMITH, Assistant Examiner U.S. Cl. X.R.

324—125